(No Model.) 7 Sheets—Sheet 1.
P. P. CRAVEN.
TYPE DISTRIBUTING MACHINE.
No. 441,750. Patented Dec. 2, 1890.
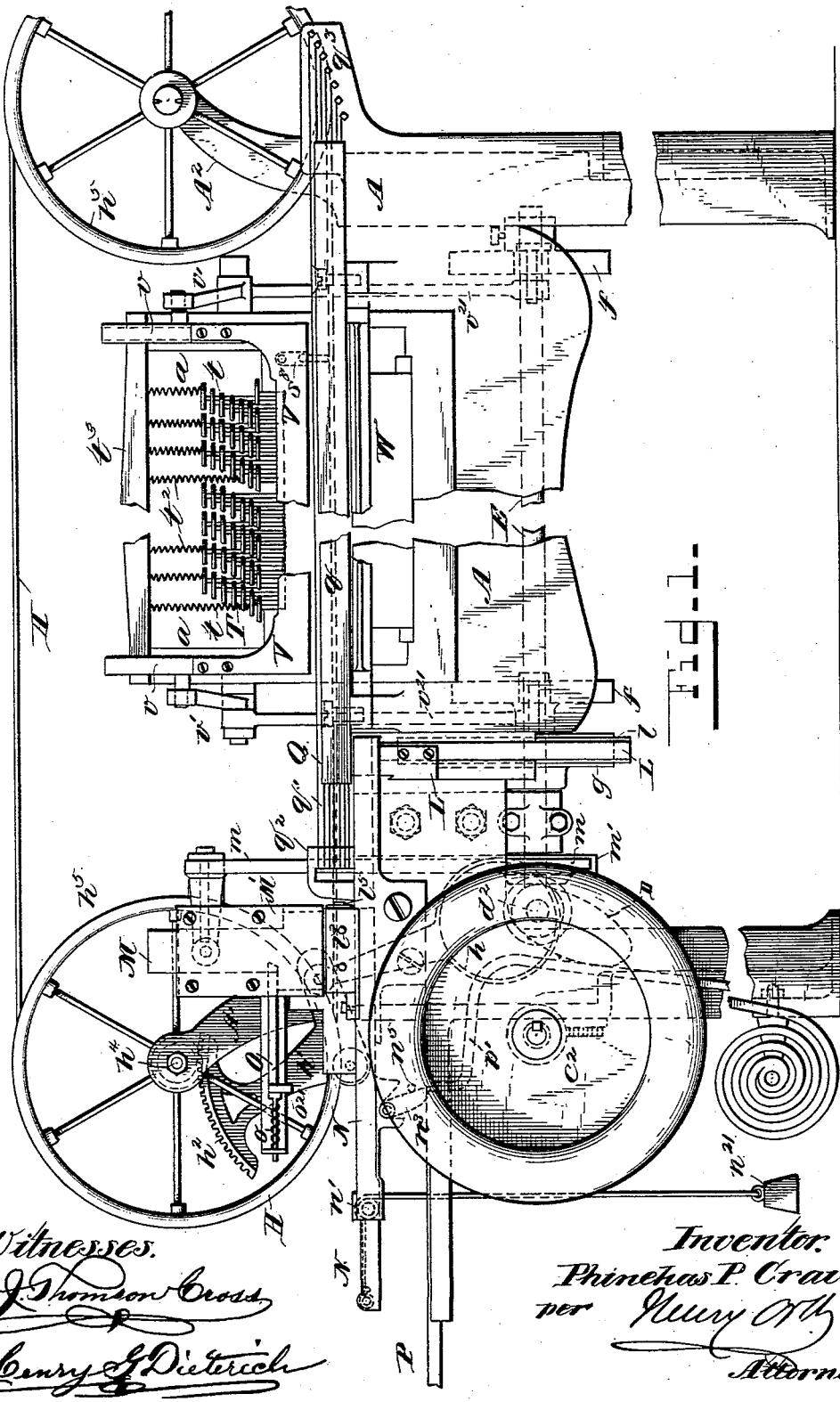
Witnesses.
J. Thomson Cross
Henry G. Dieterich
Inventor.
Phinehas P. Craven
per Henry Orth
Attorney.

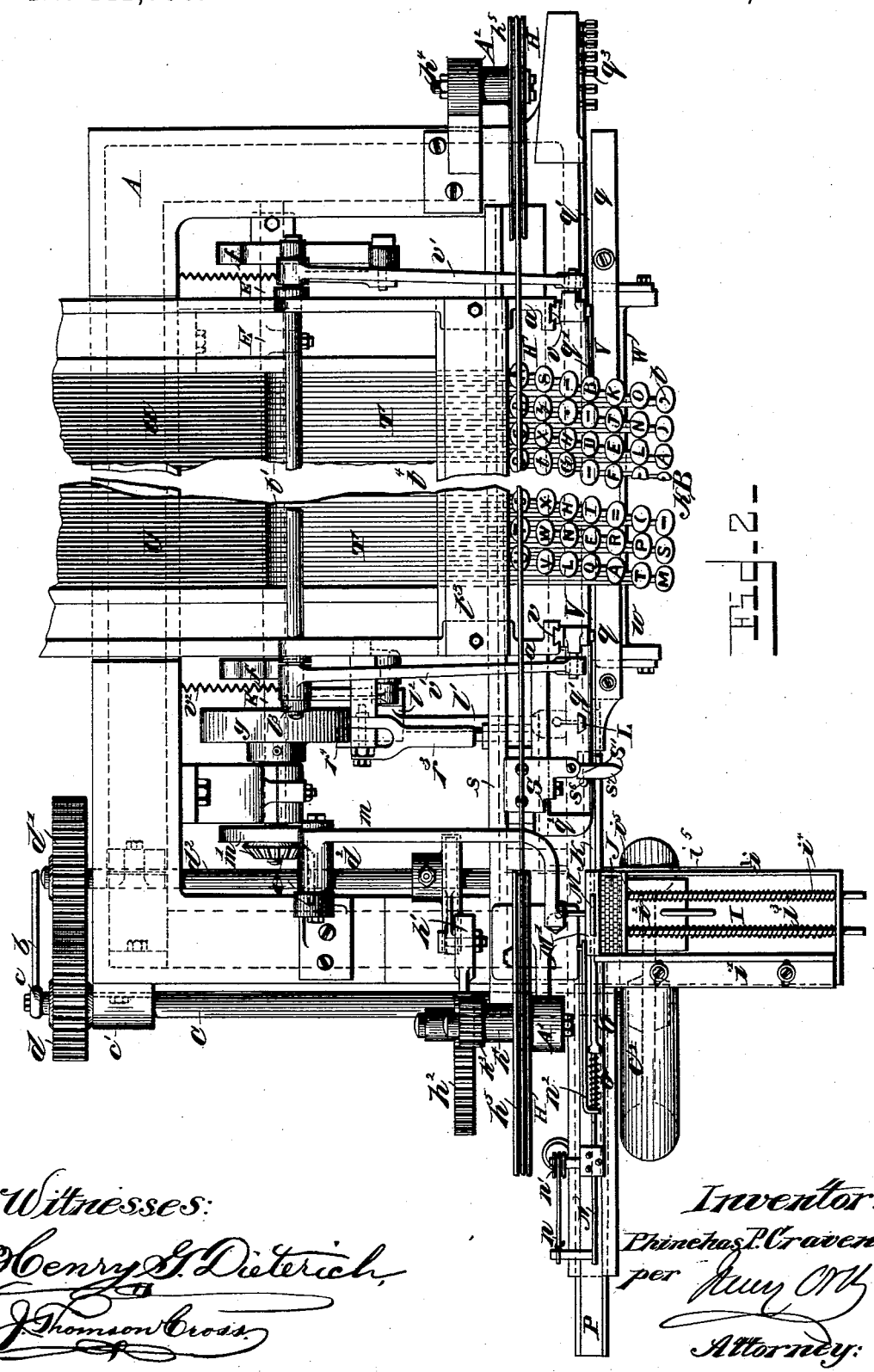

(No Model.) 7 Sheets—Sheet 3.
P. P. CRAVEN.
TYPE DISTRIBUTING MACHINE.
No. 441,750. Patented Dec. 2, 1890.
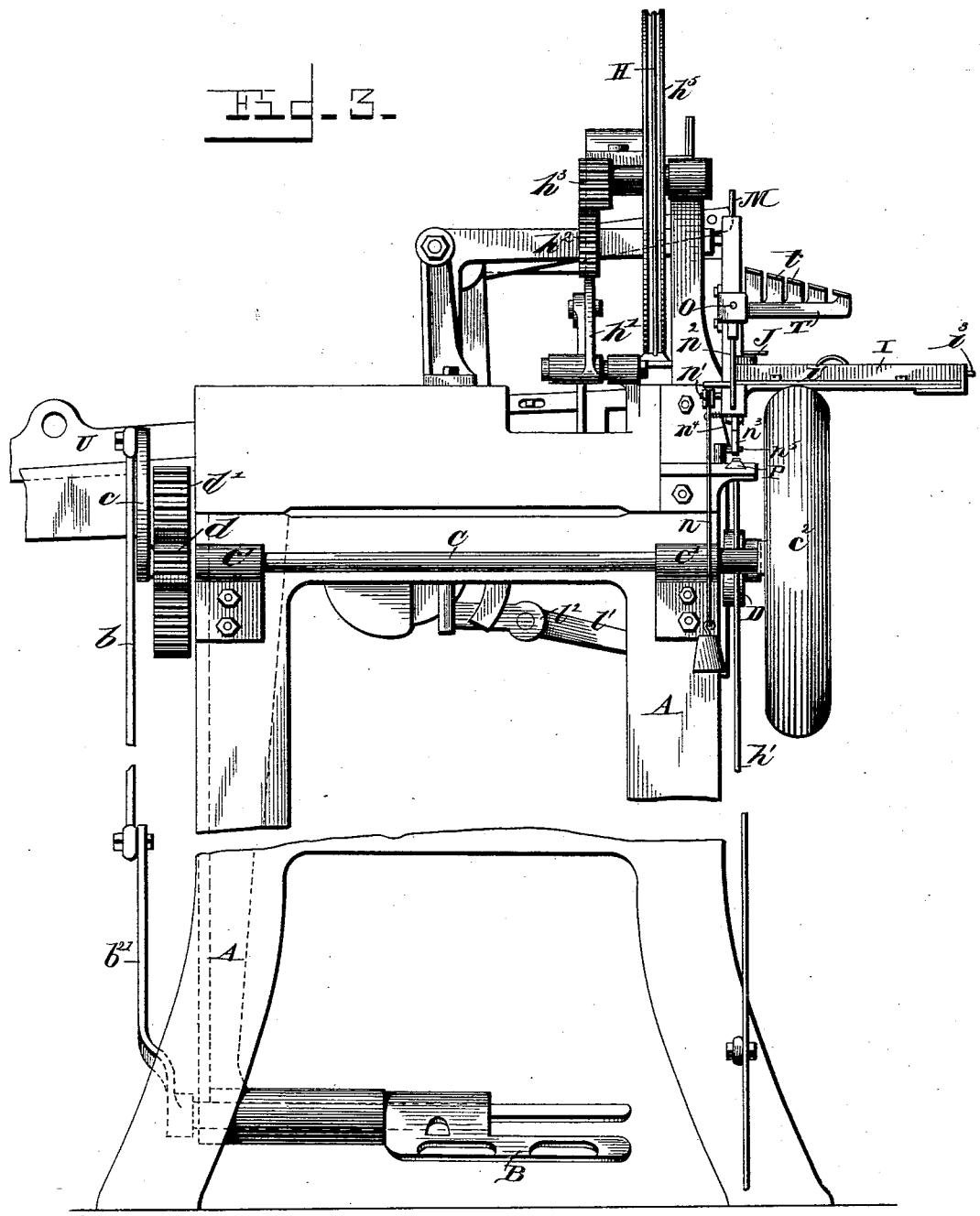
Witnesses:
Henry G. Dieterich
J. Thomson Cross
Inventor:
Phinehas P. Craven,
per
Attorney.

(No Model.) 7 Sheets—Sheet 4.
P. P. CRAVEN.
TYPE DISTRIBUTING MACHINE.
No. 441,750. Patented Dec. 2, 1890.
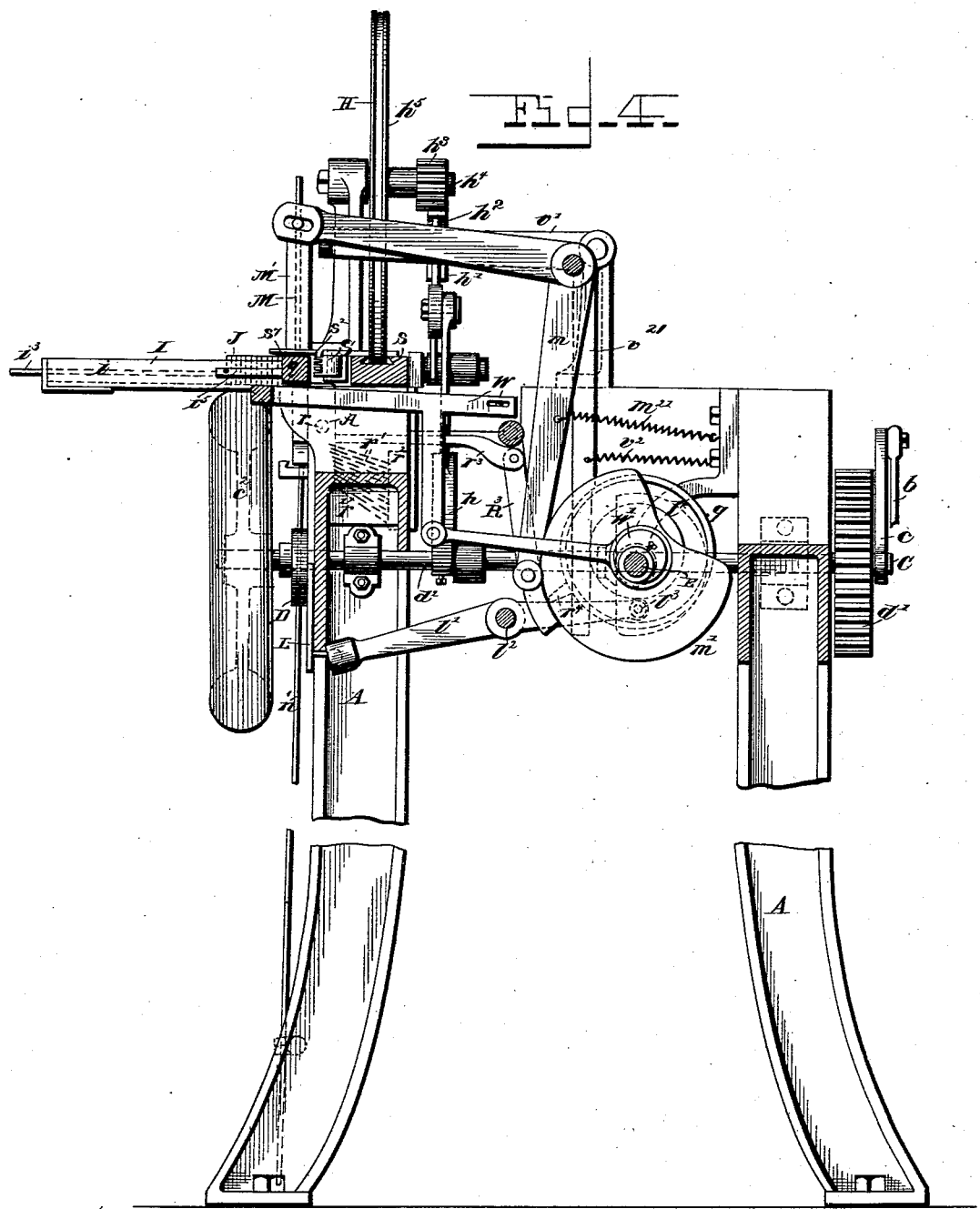
Witnesses:
Henry G. Dieterich
J. Thomson Cross
Inventor:
Phinehas P. Craven.
per Henry Orth
Attorney.

(No Model.) 7 Sheets—Sheet 5.
P. P. CRAVEN.
TYPE DISTRIBUTING MACHINE.
No. 441,750. Patented Dec. 2, 1890.
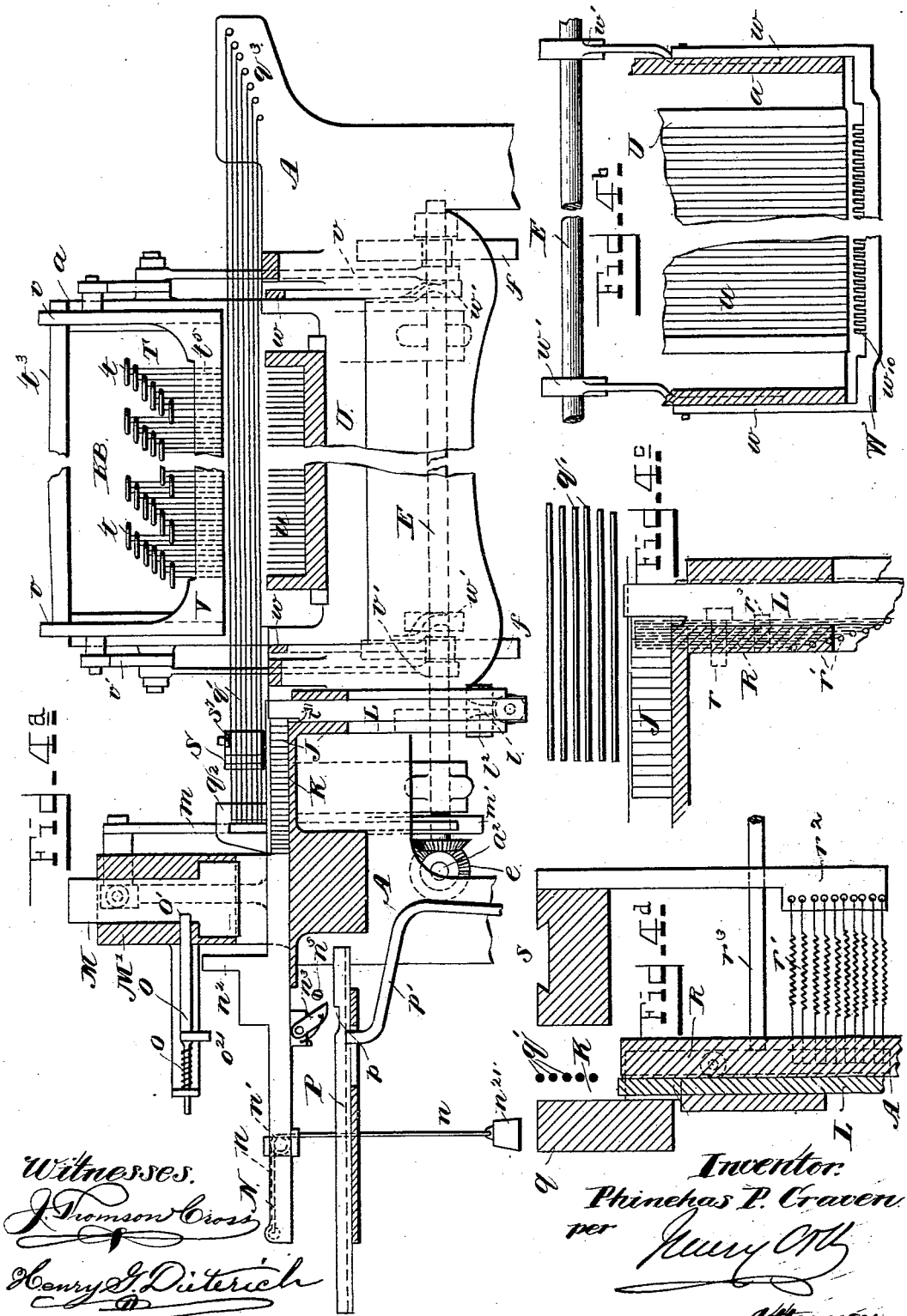
Witnesses.
J. Thomson Cross
Henry G. Dieterich
Inventor:
Phinehas P. Craven
per
Henry Orth
Attorney.

(No Model.) 7 Sheets—Sheet 6.
P. P. CRAVEN.
TYPE DISTRIBUTING MACHINE.
No. 441,750. Patented Dec. 2, 1890.
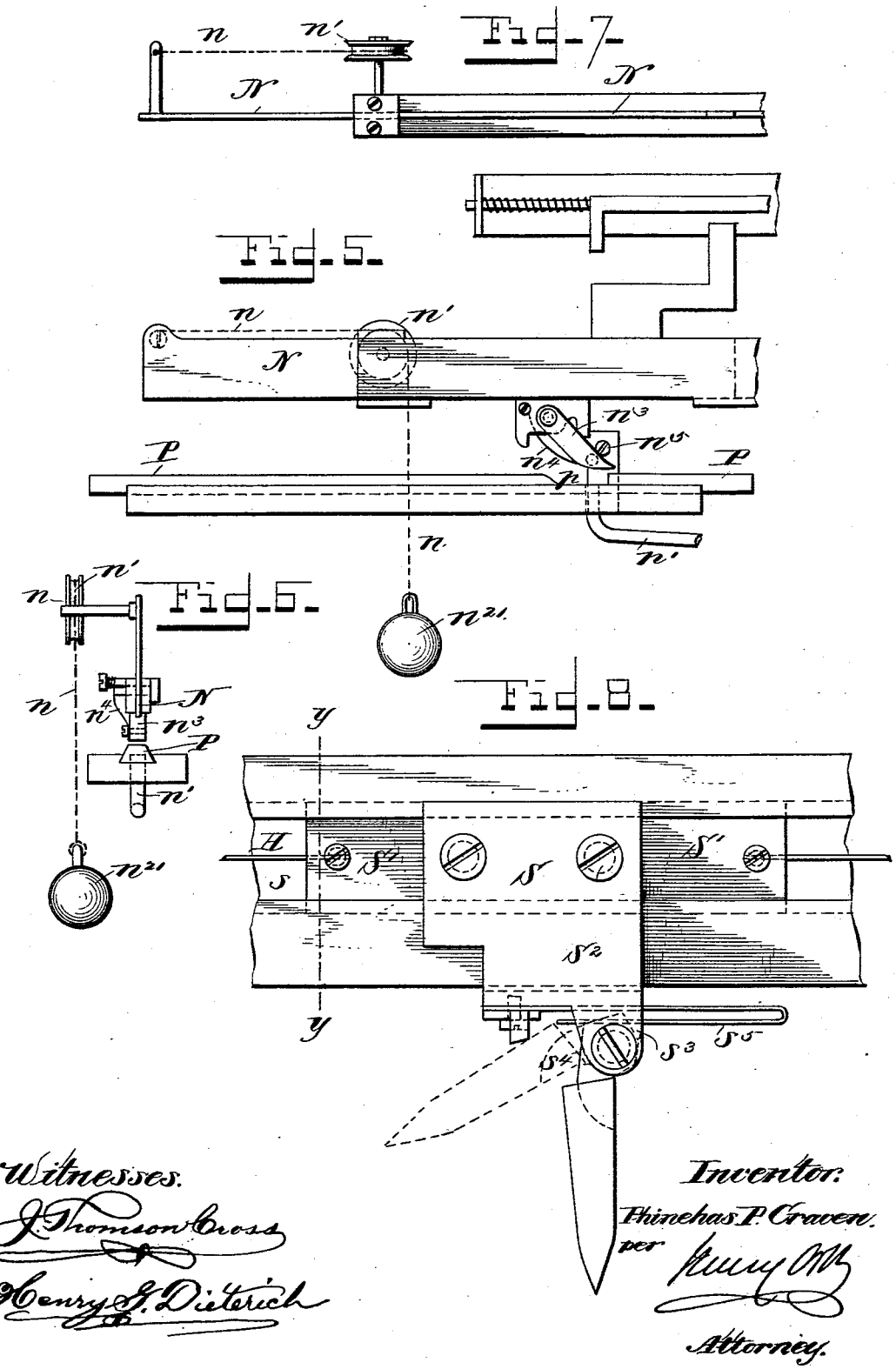

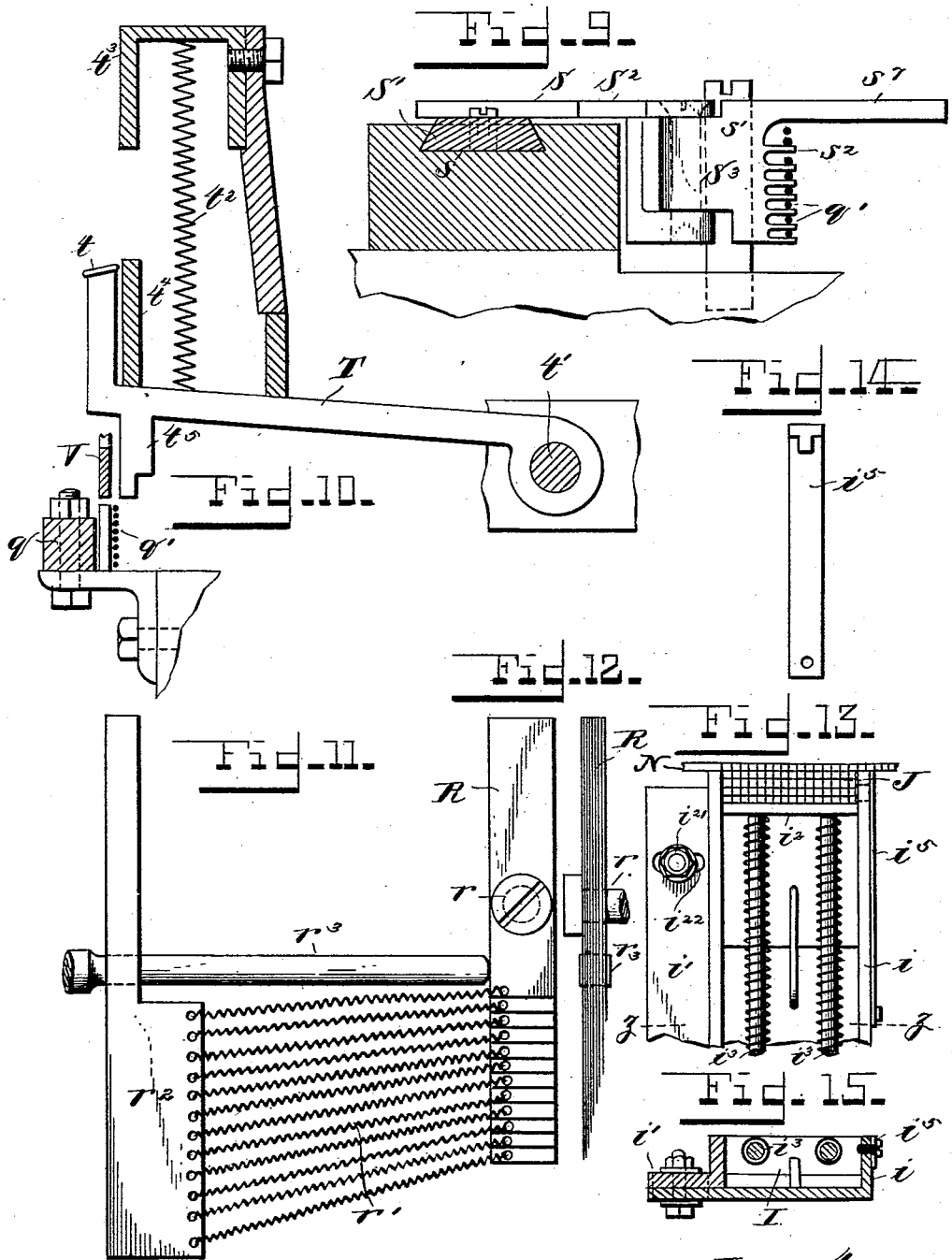

UNITED STATES PATENT OFFICE.

PHINEHAS PEARSON CRAVEN, OF WEST BRUNSWICK, VICTORIA.

TYPE-DISTRIBUTING MACHINE.

SPECIFICATION forming part of Letters Patent No. 441,750, dated December 2, 1890.

Application filed May 23, 1889. Serial No. 311,906. (No model.) Patented in Victoria November 27, 1886, No. 4,824; in New South Wales April 18, 1888, No. 624; in South Australia April 19, 1888, No. 1,007; in New Zealand April 26, 1888, No. 2,947, and in Queensland August 24, 1888, No. 459.

*To all whom it may concern:*

Be it known that I, PHINEHAS PEARSON CRAVEN, gentleman, a subject of the Queen of Great Britain, residing at Park Street, West Brunswick, near Melbourne, in the British Colony of Victoria, have invented new and useful Improvements in Type-Distributing Machines, (for which I have obtained patents in the following British colonies, namely: in Victoria, patent dated the 27th day of November, 1886, No. 4,824; in New South Wales, patent dated the 18th day of April, 1888, No. 624; in South Australia, patent dated the 19th day of April, 1888, No. 1,007; in New Zealand, patent dated the 26th day of April, 1888, No. 2,947, and in Queensland, patent dated the 24th day of August, 1888, No. 459,) of which the following is a specification.

This invention consists in the improved type-distributing machine hereinafter described, whose purpose is to break up columns of composed type after their removal from the printing-press and place and arrange or distribute them in their respective compartments or channels in a type case or cabinet ready for being again composed or set up in the improved type-setting machine for which I have filed an application for Letters Patent contemporaneously with this application. This said type-distributing machine has motion imparted to it either by a treadle worked by the operator or by other mechanism, and after the column of composed type to be distributed is placed in what I term the "galley" of the machine all that is required of the operator is to press down the key which corresponds with the character of the individual type which is being taken from the line in order to place it in its proper channel in the type case or cabinet. This galley consists of a horizontal channel of a width to suit the columns of type to be distributed, which are therein pressed forward by means of coiled springs or weights. One line of type at a time is automatically taken from this galley and is delivered to a race or channel by a vertical intermittently-reciprocating plunger, hereinafter referred to as the "line-plunger," immediately the whole of the previous line has been worked forward far enough to leave a clear space for the next line. The type are continuously driven forward in the said race or channel into a position over a plunger to which a vertical reciprocating motion is imparted, and which is so arranged that at each upward stroke it takes with it the end type only. The next adjoining type to the one which is being raised by this plunger is prevented from ascending with the one so being raised by a series of thin levers actuated by suitable springs that are strong enough to cause said levers to bear against the said type with sufficient force to overcome the side friction of the ascending type. The said ascending type is raised to another race, whose inside is formed of a number of piano-wire strings, and whose outside is formed by an adjustable bar of any suitable material. The type is carried along in this wire race by a sliding carrier of special construction until the said carrier is thrown out of gear by a stop which projects from under the key which has been depressed by the operator. The type is now left in the wire race immediately above the channel or column in the type-cabinet which corresponds to the key that has been depressed by the operator. A pushing-down device now comes into action and presses the type down into such channel or column, and then another device is brought into play which forces the type along the said channel or column, so as to clear a space ready to receive the next type pressed down from the wire race above. These various instrumentalities are so assembled and arranged as that the above-described motions will be brought into action at the required moment to effect the necessary change of position during the progress of the type from the galley to their respective channels or columns in the type-cabinet, and the whole of the mechanism is arranged on a suitable metal frame, whose front is furnished with the key-board or set of keys, which are lettered off or marked to correspond with the characters used in printing.

Having now generally described and ascertained the nature of my invention and in what manner the same is to be performed, I will proceed to describe it more particularly by reference to the accompanying drawings, in which—

Figure 1 is a side elevation, Fig. 2 a plan, and Fig. 3 an end elevation, of a type-distributing machine constructed according to my invention. Fig. 4 is a transverse vertical section on line $x$ $x$, Fig. 1. Fig. $4^a$ is a longitudinal section of the machine through the type-channel K and race Q. Fig. $4^b$ is a horizontal sectional detail view of a portion of the type-cabinet, showing the combination therewith of the push-bar that operates on the type in the channels therein. Fig. $4^c$ is a vertical sectional elevation showing the single type-plunger L and its arrangement relatively to the type-galley and race Q. Fig. $4^d$ is a vertical sectional elevation showing the arrangement of the type-retaining levers R relatively to the type-channel and the race Q. Fig. 5 is a side elevation of the device, hereinbefore mentioned, for pushing the line of type forward to be acted upon by the vertically-reciprocating plunger, which raises said type one at a time into the wire race. Fig. 6 is a rear elevation, and Fig. 7 a plan, of said device. Fig. 8 is a plan of the type-carrier, and Fig. 9 is a vertical transverse section on line $y$ $y$, Fig. 8. Fig. 10 is a vertical transverse section of a portion of the machine, illustrating the construction and arrangement of the keys. Fig. 11 is a side and Fig. 12 a front elevation of the thin levers employed to overcome the side friction of the ascending type against the next one to it. Fig. 13 is a plan of a portion of the galley into which the type to be distributed is placed. Fig. 14 is an elevation of the inside of a spring used to prevent the front line of type in the galley from falling into the race beneath until pushed down by the line-plunger. Fig. 15 is a vertical cross-section on line $z$ $z$, Fig. 13.

In the above drawings, A indicates the table of the machine, which is constructed in the form of a polygonal frame supported from suitable standards or legs, in which table are formed suitable bearings below what may be termed the "key-board" K B, Figs. 1 and $4^a$, for the type-cabinet U, that is to receive the type, so that the said cabinet may be moved into and out of its bearings, as required, said cabinet U being provided with type-channels $u$, the number of which will be equal to the number of type usually employed.

The key-board K B is arranged above the cabinet, the keys T being all mounted on the same shaft $t'$, Figs. 2 and 10, said keys being provided with a finger-plate $t$, bearing a letter. The keys are so arranged relatively to the channels $u$ in the type-cabinet U as that one key will lie above one of said channels, or substantially so, each key being provided with a foot or heel $t^5$, adapted to pass in rear of the race and determining the point to which each type is moved, for purposes presently described, and as more clearly shown in Fig. 10, each key being connected with a spring $t^2$, that serves to return the same into its normal position after being pressed down and relieved of pressure. A stop-bar $t^4$, Figs. 2 and 10, is provided to limit the upward movement of the keys under the stress of their springs.

The type to be distributed will be placed in a galley I, adapted to be supported from the table A, with its open end in proximity to a channel or gutter K, formed in the front longitudinal bar of the table A. (See Figs. 2 and $4^a$.) One side $i$ of the galley I is a fixture, while the other side is adjustable, so as to adapt it for the reception of columns of type varying in width, the adjustment being effected by means of a bolt and nut $i^{21}$, passing through a slot $i^{22}$, formed in a bottom flange of the side wall $i'$ and through the bottom of the galley. (See Fig. 13.) Within the galley I is arranged a follower $i^2$, that bears upon the column of type, said follower $i^2$ being provided with two guide-rods $i^3$, that pass through holes in the rear end wall of the galley, coiled springs $i^4$ abutting against the follower, and the said end wall being mounted on the rods to constantly urge the said follower forward, so that as each line of type is moved into the type-channel K, as hereinafter described, the column of type is fed forward.

As shown in Figs. 2, 4, and 13, a spring $i^5$ is secured to the stationary or left-hand wall of the galley I, and at its free end the said spring is provided with a T-shaped head that lies in a corresponding slot in said side wall and bears against the foremost rows of type, so as to prevent them from falling over into channel K. That portion of the rear wall of the channel K immediately in front of the galley I is extended upwardly to prevent the type from being pushed across said channel.

When the machine is in operation, the foremost line of type in the galley is firmly held against the said extended portion of the rear wall by the type in rear thereof under the pressure exerted by the spring-actuated follower, and said row of type is prevented from dropping into channel K by the type therein or by the feed-bar N, or by both. The pressure exerted by the spring-actuated follower $i^2$ is sufficient to hold the line of type above channel K against movement with the feed-bar N or the type already in said channel.

The device for transferring the type from the galley to the type-channel, from the latter channel to the race, and from the race to the type-cabinet may be operated from any suitable prime motor.

In the drawings I have shown a treadle B, whose shaft carries a crank $b^{21}$, that is connected by a rod $b$ to a crank $c$ on the main driving-shaft C. (See more particularly Fig. 3.) This shaft also carries a fly-wheel $C^2$ and a pinion $d$, that gears with a pinion $d'$ on a parallel shaft $d^2$. The last-named shaft carries one of a pair of pinions $e$, the other being mounted on a longitudinal shaft E, (see Fig. 2,) in which the pinion on shaft $d^2$ is shown in dotted lines. (See also Fig. 4ª.) The shaft $d^2$ also carries a cam D, that is adapted to impart a reciprocating motion to an actuating-bar, hereinafter to be described.

The shaft E carries two cams or eccentrics $ff$, that operate the pusher-bar that serves to push the type from the race into the type-cabinet. The shaft E also carries two cams or cam-wheels $m$ and $g$, that serve to operate the line and the single type plungers or followers, respectively, and two eccentrics $ww'$, that serve to impart a reciprocating motion to the pusher or feed-bar that serves to feed or push the type along the channels $u$ as they are transferred thereto, as hereinafter explained.

The shaft $d^2$ carries besides the pinion $e$ an eccentric $h$, the rod of which is connected with one arm of a bell-crank lever $h'$. The other longer arm of said lever terminates in a quadrant-rack $h^2$. (See Figs. 1, 2, and 3.) The quadrant-rack is in gear with a pinion $h^3$, mounted on the spindle $h^4$ of a grooved wheel $h^5$, said spindle $h^4$ having its bearings in an arm A', projecting from the table A, a similar wheel $h^5$ being mounted in an arm A² at the opposite end of the table A. These two wheels $h^5$ $h^5$ serve to impart a reciprocating motion to a type-carrier S by means of the band or cord H, as hereinafter explained, an oscillating motion being imparted to the wheel $h^5$ at the left end of the machine through the bell-crank lever $h'$ and eccentric $h$.

It has hereinbefore been stated that the lines of type are successively transferred from the galley to the type-channel K by a plunger, which I will hereinafter call the "line-plunger," in contradistinction to another plunger, hereinafter called the "single-type plunger," that lifts the type singly from the type-channel K into the race to be moved along said race by the type-carrier in front of the proper channel in the type-cabinet and to be finally transferred from the race to the cabinet by a push-bar.

The line-plunger is indicated by the letter M and is guided in a standard or head M', (see Figs. 1, 2, 4, and 4ª,) the plunger or piston end of which is of such length as to take the longest line of type used. A periodical vertical reciprocating motion is imparted to the line-plunger M through the medium of the lever $m$, a spring $m^{21}$, and the cam-wheel $m'$ on longitudinal shaft E, hereinabove referred to and as shown in Figs. 1, 2, 4, and 4ª. The lever $m$ and plunger M are moved downwardly under the stress of the spring $m^{21}$ whenever the cam-wheel $m'$ is in proper position, while said cam-wheel returns the lever and through the latter the plunger M into their normal or elevated position. The line-plunger M is furthermore locked into an inoperative position by means of a spring-actuated locking-bolt O, Figs. 1, 2, 3, and 4ª, that engages a notch $o'$ in the stem of the line-plunger M and is automatically released through the medium of mechanism which I will now describe. The foremost line of type of the column J of such is held above the type-channel K, as hereinbefore described, and after being transferred by the line-plunger M to said channel K is fed forward to the single-type plunger L by means of a feed-bar N, Figs. 1, 2, 3, and 4ª, working in the type-channel K and being constantly pressed against the line of type by a weight $n^{21}$, suspended from a cord $n$, that is attached to the end of the feed-bar N, after passing over a guide pulley $n'$, the spindle of which has its bearings in or is secured to a suitable projection on the table A.

In a slotted projection on the under side of the bar N is pivoted a pawl $n^3$, held in an elevated position by a spring $n^4$, the nose of said pawl lying in the path of a stop-pin $n^5$, projecting from the frame. The bar N is furthermore provided with an arm $n^2$, projecting from the upper side thereof into the path of an arm $o^{21}$, Fig. 4ª, depending from the locking-bolt O, that locks the line-plunger M against motion.

P is an actuating-bar that is adapted to reciprocate in a suitable guide-groove in the frame, such reciprocating motion being imparted to said bar by a spring-arm $p'$ through the medium of the cam D on shaft $d^2$, as shown in dotted lines in Fig. 1 and in full lines in Fig. 3 and hereinbefore referred to. When the push-bar N has moved forward sufficiently, its pawl $n^3$ engages the stop-pin $n^5$, whereby said pawl is brought into a vertical position, so as to engage a notch $p$, Fig. 4ª, in the upper face of said bar P, whereby the feed-bar N is moved back. These devices are also shown in detail views, Figs. 5, 6, and 7. It will be seen that the forward motion of the bar N is limited by the stop-pin $n^5$, and the position of such pin is such as to permit the bar N to move the line of type in channel K toward or to the single-type plunger until the last type of the line has been moved out of said channel into the race by the said single-type plunger, whatever the length of the line of type may be within the capacity of the galley I, so that as the last type is moved over the single-line plunger the pawl $n^3$ on push-bar N contacts with pin $n^5$ and is brought into engagement with the reciprocating bar P, by which the feed-bar N is carried back against the stress exerted by the weight $n^{21}$. As the bar N is about to reach the limit of its motion from right to left, its arm $n^2$ engages the arm $o^{21}$ of the spring-bolt O and carries the same along a sufficient distance to release the line-plunger, which then descends to transfer the next line of type from the galley I to the type-channel K. The actuating-bar P now moves forward, the pawl $n^3$ being released, and is carried to its normal position by the spring $n^4$, and under the stress of the weight $n^{21}$ the feed-bar N also moves forward to feed the line of type along the channel K.

The single-type plunger L, Figs. 1, 2, and 4$^a$, is guided in a suitable bracket $l$ on the frame, and when in its normal position the upper face thereof lies above the type-channel K. On that side which faces the line of type the plunger L is recessed or has a portion cut away to form a receiving shoulder or seat $l^{31}$, Fig. 4$^a$, of such width as to hold but a single type—that is to say, the width of the seat is equal to the thickness of the thinnest type used in the machine—which will afford sufficient bearing for the thicker type to rest on, so that as the plunger moves upward to carry said type to the race Q said plunger will act as a stop to prevent the line of type being pushed beyond the same by the feed-bar N, while the type next to the one on the plunger-seat will act as a guide for the type on said seat as said plunger moves up. A vertical reciprocating motion is imparted to the line-plunger L by means of a bell-crank lever $l'$, pivoted in a stud $l^2$, screwed into the framing of the machine, the plunger L being connected to the horizontal arm of said lever, whose other arm carries a roller $l^3$, (shown in dotted lines in Fig. 4,) that travels in a cam-groove $l^4$, formed in one of the faces of the cam-wheel $g$ on longitudinal shaft E, hereinbefore referred to. The amplitude of the vertical motion of the single-type plunger is sufficient to carry a single type from the channel K up into the race Q.

In order to hold the type in proper position for feeding the same to the receiving-shoulder $l^{31}$ of the single-type plunger, I employ a series of thin levers R, mounted on a stud $r$ common to all of them, said levers varying in length to permit the connecting of each of them with a spring $r'$, whose other end is attached to an arm $r^2$, secured to the framing, whereby said levers are held in contact with the line of type and lock the same by pressure thereon against motion under the action of the feed-bar N. These levers are arranged in rear of the type-channel K to one side of the single-type plunger L, and between it and the galley I, and said levers are moved out of contact with the line of type by a push-bar $r^3$, that is adapted to apply pressure at a point below their fulcrum, said bar $r^3$ being withdrawn at the proper moment. To these ends the bar $r^3$ is connected with a lever $R^3$, that is actuated by the cam $g$ on shaft E, said cam having a projection $r^4$, (shown in dotted lines in Fig. 4,) adapted to withdraw the bar out of contact with the levers R.

The object of employing a number of thin plates instead of a solid lever is to avoid too great a resistance to the motion of the type, so that a comparatively small amount of power is required to feed the line of type to the plunger.

It has been stated that the said plunger L elevates a type from the channel K to the race Q. The front wall of this race Q is formed by a bar $q$, secured to the table or framing of the machine, while the rear wall is formed by wires $q'$, (piano-wires being preferably used,) one end of which is attached to a standard $q^2$ and the other to tightening or stretching pins $q^3$, (see Figs. 1 and 4$^a$, also Figs. 4$^d$ and 4$^c$,) said race having neither top nor bottom walls, the type being held therein by the tension or pressure exerted by the wires $q'$ thereon exclusively, and, as said wires are more or less yielding, type of varying thickness will be held therein. As each type is transferred from the channel K to the race Q, it is moved along said race to the key-board by a type-carrier S, the key corresponding to the type and to the channel $u$ in the type-cabinet U that is to receive said type being first depressed, the heel or foot $t^5$ of such key operating to determine the limit to which each type is carried. The type-carrier S, Figs. 2, 4, 4$^a$, 8, and 9, is composed of a carriage S', Figs. 8 and 9, adapted to travel in a groove $s$, formed in the table A of the machine, and to which carriage are attached the ends of the band H that passes around the grooved pulleys $h^5$, hereinabove referred to. To the carriage S' is secured a frame S$^2$, in which is pivoted the carrier proper S$^3$, which is provided with comb-teeth $s^2$, that pass between the race-wires $q'$ and serve to carry the type along. The comb-like carrier S$^3$ has an arm $s^7$ projecting over the race, and the hinge-knuckle or pivot-bearing has two flat faces $s^3$ $s^4$, substantially at right angles to each other, against one or the other of which bears a flat spring $s^5$ to hold the comb in its operative or non-operative position. In Figs. 2, 8, and 9 the carrier is shown in its operative position; but when it reaches the limit of its movement from left to right or toward the key-board, which is determined by a stop-pin $s^8$, Fig. 1, or the limit to which a type J is to be carried, which is determined by the heel $t^5$ of the key T, held depressed for the time being, the arm $s^7$ will come in contact with said heel $t^5$ and will be tilted or swung around to bring its flat face $s^4$ in position to be acted upon by the spring $s^5$, the comb-teeth being then withdrawn from the race Q, as shown in dotted lines in Fig. 8, the carrier S continuing its motion to the right to the extent to which it is moved by the oscillations of the band-wheels $h^5$. Should the operator omit to depress the proper key, the type which may then be in race Q will be carried slightly beyond the key-board K B, where it will be left as soon as the finger $s^7$ of the carrier strikes the pin $s^8$, by which it is turned out of the race. Such type may then be removed by hand. The carrier S$^3$ is brought back into its operative position as it is about to reach or reaches the limit of its movement from right to left by contact with a stop-pin $s^6$, Fig. 2, thus bringing its flat face $s^3$ again into position to be acted upon by the spring $s^5$, which then holds the carrier in its operative position with the teeth $s^2$ projected into the race. It will be seen that when the carrier $s^3$ reaches the limit to which the type is to be carried, as determined by the key T, depressed for the time being, said carrier is turned out of the way of the heel $t^5$ of the depressed key, the type being held in the race Q above the channel $u$ in the type-cabinet destined to receive it and is at once transferred from said race to said channel through the following instrumentalities:

V is a presser plate or bar that is secured at its opposite ends to slides $v\ v$, working in dovetailed grooves formed in the front face of the uprights or standards $a\ a$ of the framing, said slides $v$ being connected to one of the arms of the bell-crank levers $v'\ v'$, the other arm $v^{21}$ of which carries rollers in contact with the cams $f\ f$, as shown in dotted lines in Figs. 1 and $4^a$, whereby a vertical reciprocating movement is imparted to the presser-plate V, so timed as to move downward immediately after or shortly after the carrier $S^3$ has been turned out of the race, as described, to transfer the type from the race Q to the cabinet U.

In order to make room in the various type-channels $u$ of the cabinet for the reception of the successive types transferred thereto, I employ a push-bar W, that is provided with plungers or pistons $w^{10}$, see Fig. $4^b$, one for each type-channel $u$ of cabinet U. The plungers $w^{10}$ of the bar W are of such length as to move the type in the channels $u$ a distance equal to or slightly greater than the height of such type in order to make room for the next type transferred to said channels from the race Q. To this end the push-bar has a substantially horizontal reciprocating motion imparted thereto by means of the following instrumentalities: The bar is supported from guide-arms $w\ w$, connected with the rods of eccentrics $w'\ w'$ on shaft E. (See Figs. 2, 4, $4^a$, and $4^b$.)

The operation of the machine may be briefly described as follows: The column of type to be distributed is placed in the galley I, wherein it will be pressed forward by the spring-actuated follower $i^2$, and if the machine is driven by suitable power—as, for instance, by the operator working the treadle B—then the line-plunger M will come into operation and will carry the end line of the type J from the galley I down to the passage K underneath, wherein it will be pressed forward by the feed-bar N until the end type reaches the single-type plunger L, which will in its upward movement raise said end type up into the wire race Q, along which it will be carried by the carrier S until it is in position above its proper channel or column in the type case or cabinet, where (providing its corresponding key T has been depressed) the carrier S will be turned out of the race by contact with the heel $t^5$ of the key and leave the type in position to be transferred to the type-cabinet U. The presser-plate V will then descend and will press the type out of the wire race Q into the top end of its channel in the cabinet U. The horizontally-reciprocating comb-shaped pusher-bar W will next come into operation and will push said type along its channel, so as to leave a clear space ready to receive the next similar type that is delivered to the type case or cabinet. When the type in the channel K have been worked out sufficiently to allow of a fresh line being delivered to it from the galley I, the spring-pawl $n^3$ will contact with the stud $n^5$, and will thereby be caused to assume a vertical position, when it will engage with the notch $p$ in the sliding bar P on the return movement of said bar. The effect of this will be to carry back the feed-bar N almost to the full extent of its travel, when its arm $n^2$ will engage with the catch O, so as to draw it back out of engagement with the notch $o'$ in the line-plunger M, which will thus be released and allowed to descend in order to push a fresh line of type into the channel K, the type J in the galley I meanwhile being pressed together sidewise by the spring $i^5$. The thin spring-levers R hold the type so as to allow of only the one over the single-type plunger L being raised thereby, and they maintain this pressure until the said plunger returns to its normal position ready for the next stroke, when the projection $r^4$ on the cam-wheel $g$ will operate to draw back the pusher-bar $r^3$, so that said levers may release their hold of the type. The back of the race Q being formed of stretched wires, it acts as a flexible support to hold the type while being carried from the single-type plunger E into position above their respective channels or columns in the type-cabinet U.

Having described my invention, what I claim, and desire to secure by Letters Patent, is—

1. In a type-distributing machine, the combination of the following instrumentalities, to wit: a galley for the reception of the type to be distributed, a type case or cabinet for the reception of the distributed type, said cabinet having a type-channel for each denomination of type used, a bank of keys arranged above the type-cabinet and having as many keys as there are channels in said cabinet, a distributing-channel and race extending along the front end of the galley and between the bank of keys and the type-cabinet, feeding devices for feeding the type from the galley to the type-channel and race, a type-carrier adapted to carry the type along the race, a stop on each key operating to determine the point to which each type is carried, a vertically-movable follower operating to transfer the type from the channel or race to its channel in the type-cabinet, and a horizontally-movable follower provided with a piston or plunger for each type-channel in the type-cabinet to move the transferred type out of the way to make room for the next type, as described.

2. In a type-distributing machine, the combination of the following instrumentalities, to wit: a galley for the reception of the type to be distributed, a type-cabinet for the reception of the distributed type, said cabinet having a type-channel for each denomination of type used, a bank of keys arranged above the type-cabinet containing one key for each type-channel therein, a type-channel extending along the galley in front thereof and below the same, a bottomless type-channel extending over the type-cabinet between the same and the bank of keys, a plunger adapted to transfer the type from the galley to the type-channel, a plunger adapted to transfer the type from the type-channel to the race, a feed-bar adapted to feed the type along the type-channel to the last-named plunger, a carrier adapted to carry the type along the race, a stop on each key operating to determine the point to which each type is carried when a key is depressed, a plunger adapted to transfer the type from the race to the channels in the type-cabinet, and a horizontally-movable plunger adapted to move the transferred type out of the way to make room for the next type, as described.

3. In a type-distributing machine, the combination of the following instrumentalities, to wit: a galley for the reception of the type to be distributed, a feeding device to feed the column of type forward as a line of such is removed, a type-cabinet to which the type is distributed and having a channel for each denomination of type used, a bank of keys arranged above the type-cabinet and containing a key for each channel therein, a type-channel extending along the end of the galley below the same, a bottomless race above the type-channel extending along the type-cabinet between it and the bank of keys, a line-plunger adapted to transfer the end line of type in the galley to said channel, a single-type plunger adapted to transfer the type from the type-channel to the race, a feed-bar adapted to feed the line of type to the single-type plunger, a locking device arranged between the line-plunger and galley adapted to lock the line of type, except the end one, against motion in the channel, a tripping device adapted to trip the locking device to allow the line of type to move toward the single-type plunger, a type-carrier adapted to carry the type transferred to the race along the same, a stop on each key operating to determine the point to which each type is carried when a key is depressed, a vertically-movable follower adapted to transfer the type from the race to the type-cabinet, and a horizontally-movable follower adapted to move the transferred type out of the way to make room for the next type, as described.

4. In a type-distributing machine, the combination of the following instrumentalities, to wit: a galley for the reception of the type to be distributed, a feeding device to feed the column of type forward as a line of such is removed, a type-cabinet to which the type is distributed and having a channel for each denomination of type used, a bank of keys containing a key for each channel in the type-cabinet, located above the cabinet, a type-channel extending along the end of the galley below the same, a bottomless race above the type-channel extending along the type-cabinet between it and the bank of keys, a line-plunger adapted to transfer the end line of type to said channel, a locking device adapted to lock the line-plunger against operation, a single-type plunger adapted to transfer the type singly from the type-channel to the race, a feed-bar adapted to feed the line of type to the single-type plunger and to control the locking device for the line-plunger, a locking device arranged between the line-plunger and galley, adapted to lock the line of type, except the end one, against motion in the channel, a tripping device adapted to trip the locking device to allow the line of type to move toward the single-type plunger, a carrier adapted to carry the type transferred to the race along the same, a stop on each key operating to determine the point to which each type is carried when a key is depressed, a vertically-movable follower adapted to transfer the type from the race to the type-cabinet, and a horizontally-movable follower adapted to move the transferred type out of the way to make room for the next type, as described.

5. In a type-distributing machine, the race Q, having its front wall formed by the bar $q$ and its rear wall by wires $q'$, said race being devoid of top and bottom, substantially as and for the purposes specified.

6. In a type-distributing machine, the combination, with the type-channel K, the galley I, the line-plunger M, and the feed-bar N, provided with the arm $n^2$, of the spring-actuated locking-bolt O, adapted to engage a notch in the line-plunger, said bolt having an arm $o^{21}$, depending from said bolt into the path of the arm $n^2$ on the feed-bar, substantially as and for the purposes specified.

7. In a type-distributing machine, the combination, with the type-channel K, the galley I, the line-plunger M, the feed-bar N, provided with the vertical arm $n^2$ and with the spring-actuated pawl $n^3$, the stop $n^5$ in the path of said pawl, and the spring-actuated locking-bolt O, adapted to engage a notch in the line-plunger and having an arm $o^{21}$ in the path of the arm $n^2$ of the feed-bar, of the actuating-bar P, adapted to reciprocate in suitable bearings and provided in its upper face with a notch $p$, adapted to engage the pawl of the feed-bar, substantially as and for the purposes specified.

8. In a type-distributing machine, the combination, with the galley I, the type-channel K, the feed-bar N, and the single-line plunger L, of a locking-lever composed of a plurality of spring-actuated thin plates arranged between the line-plunger and galley on one side of the type-channel and a periodically-actuated push-bar adapted to simultaneously move said levers against the stress of their springs, substantially as and for the purposes specified.

9. In a type-distributing machine, the combination, with the galley I, the type-channel K, the feed-bar N, and race Q, of the single-line plunger L, provided with the rest or shoulder $l^{33}$ and adapted to reciprocate vertically and to lift a type from channel K into race Q, a locking device composed of a plurality of spring-actuated thin plates arranged between the single-line plunger and the galley on one side of the said channel K and adapted to hold the type therein in proper position relatively to the single-line plunger, and a push-bar adapted to simultaneously move said lever-plates against the stress of their springs, substantially as and for the purposes specified.

10. In a type-distributing machine, the combination, with the single-type plunger L and the race Q, of a type-carrier comprising a carriage adapted to be reciprocated along said race, a carrier pivotally connected with the carriage and having teeth adapted to be projected into the race, and a stop adapted to operate on said carrier and rotate the same on its pivot to turn the teeth thereof out of the race, substantially as and for the purposes specified.

11. In a type-distributing machine, the combination, with the single-type plunger L, the race Q, and a stop at both ends of said race, of a carrier comprising a carriage adapted to be reciprocated along the race and a carrier pivotally connected with the carriage and provided with teeth adapted to be projected into the race and with a finger or projection extending across the race above the same and adapted to contact with the stops at each end of said race, substantially as and for the purposes specified.

12. In a type-distributing machine, the combination, with the single-type plunger L, the race Q, and a stop at both ends of said race, of a carrier comprising a carriage adapted to be reciprocated along the race, a carrier pivoted to said carriage and having two flat locking-faces $s^3$ $s^4$, substantially at right angles to each other, and the spring $s^5$, adapted to engage one or the other of said faces and lock the carrier in position, said carrier being provided with teeth adapted to be projected into the race and with a finger extending across the said race above the same and adapted to contact with the stops at the ends of such race, substantially as and for the purposes specified.

13. In a type-distributing machine, the combination, with the race Q and stop $s^6$ at one end thereof, and the keys T, arranged above said race and provided with a heel $t^5$, adapted to move in proximity to the race when the key is depressed, of the type-carrier comprising a carriage adapted to be reciprocated along the race and a carrier pivotally connected with the carriage and provided with teeth adapted to be projected into the race and with a finger extending across the same above it and adapted to contact with the heel of a depressed key and with the stop $s^6$, according to the direction of motion of said carrier, substantially as and for the purposes specified.

14. In a type-distributing machine, the combination, with the race Q, the carrier S, the keys T, arranged and operating as described, and the type-cabinet U, having type-channels $u$, arranged below the keys and race, of the presser-plate V, adapted to have a vertical reciprocating motion in the race for transferring the type therein to the cabinet, as set forth.

15. In a type-distributing machine, the combination, with the race Q, the presser-plate V, adapted to have a vertical reciprocating motion in said race, and the type-cabinet U, provided with type-channels $u$, arranged horizontally below the race, of the plunger-bar W, provided with a plunger for each channel $u$ in the type-cabinet, said bar being adapted to reciprocate in a horizontal plane, and said plungers being adapted to enter the type-channels, substantially as and for the purposes specified.

16. In a type-distributing machine, the combination, with the race Q and the type-carrier S, of mechanism to impart a reciprocating motion to said carrier, comprising the band-wheels $h^5$, the band H, whose ends are attached to the carrier-carriage S', the pinion $h^4$ on the spindle of one of the band-wheels, the bell-crank lever $h'$, having the quadrant-rack $h^2$ formed on one of its arms, said rack meshing with the pinion $h^4$, and an eccentric connected with the other arm of the bell-crank lever, adapted to impart a rocking or oscillating motion to said lever, substantially as and for the purposes specified.

17. In a type-distributing machine, the combination, with the line-plunger M and the spring-actuated locking-bolt O, adapted to lock said line-plunger against motion, said bolt having a depending arm $o^{21}$, the feed-bar N, provided with the vertical arm $n^2$, adapted to engage the arm $o^{21}$ on the bolt O, said feed-bar having a spring-actuated pawl on its under side, and a fixed stop adapted to be engaged by the pawl to move the same against the stress of its spring, of the bar P, provided with a notch in its upper face adapted to be engaged by the pawl on the feed-bar, and mechanism for imparting a continuous reciprocating motion to the bar P, comprising a spring-arm connected with the bar and a continuously-revolving cam operating upon said spring-arm, substantially as and for the purposes specified.

18. In a type-distributing machine, the combination, with the type-channel K, the feed-bar N, and the line-plunger L, arranged to operate in said channel, as described, of the locking-lever R, composed of a plurality of thin steel plates assembled on a common pivot, said plates varying in length, a spring attached to the lower end of each plate and to a fixed support, said locking-lever R being arranged in rear of the type-channel on the feed side of the single-type plunger, the bar $r^3$, operating to simultaneously move the lever-plates against the stress of said springs, and mechanism to impart an intermittent motion to the bar $r^3$ to release the lever-plates, comprising a revoluble cam provided with a projection or tooth $r^4$, adapted to operate on the bar $r^3$ to withdraw the same out of contact with the lever-plates R, substantially as and for the purposes specified.

19. In a type-distributing machine, a type-carrier comprising a carriage S', a frame $S^2$, secured thereto, a carrier $S^3$, pivoted in said frame and having the flat locking-faces $s^3$ $s^4$ formed on its pivot-bearing, the said carrier being provided with comb-like teeth $s^2$, and the spring $s^5$, adapted to engage one or the other of the flat faces $s^3$ $s^4$ on the carrier-pivot bearing, in combination with a race having one of its walls constructed of spaced taut wires, substantially as and for the purposes specified.

20. In a type-distributing machine, the combination, with the type-channel K and the line-plunger M, of the galley I, arranged relatively to the type-channel as described, the spring-actuated follower $i^2$, and the spring $i^5$, the latter being arranged to bear laterally on the end type of the front line of such in said galley, substantially as and for the purposes specified.

21. In a type-distributing-machine, the combination, with the type-channel K and the line-plunger M, of the galley I, arranged relatively to the channel K as described, said galley having one of its side walls adjustable relatively to the other, the spring-actuated follower $i^2$, and the spring $i^5$, arranged to bear laterally against the end type of the front line of such, substantially as and for the purposes specified.

22. In a type-distributing machine, the combination of the following instrumentalities, to wit: a galley for the reception of the type to be distributed, a spring-actuated feeding device to feed the type from the galley, a type-channel arranged below the open end of the galley, a line-plunger adapted to have a periodical vertical reciprocating motion to transfer a line of type from the galley to the channel, a type-cabinet for the reception of the type distributed, a race arranged above the type-channel along which the type is carried, a single-type plunger adapted to reciprocate vertically in the type-channel to transfer the type from the latter to the race, a feed-bar operating in the channel to feed the type to the single-type plunger, a carrier adapted to have a reciprocating motion along the race, keys arranged above the race and having stops adapted to determine the point to which the type are carried, a plunger-bar adapted to reciprocate vertically in the race to transfer the type therein to the cabinet below the same, a horizontally-reciprocating bar provided with plungers adapted to move the type along the channels in the cabinet, driving mechanism, substantially such as described, to impart motion to said devices, and a prime motor consisting of a treadle and a crank-shaft connected therewith and adapted to impart motion to said driving mechanism, as set forth.

PHINEHAS PEARSON CRAVEN.

Witnesses:
WILLIAM HENRY CUBLEY,
WALTER SMYTHE BAYSTON.